(12) United States Patent
Barton et al.

(10) Patent No.: US 11,577,554 B2
(45) Date of Patent: Feb. 14, 2023

(54) TIRE HAVING REINFORCED SIDEWALLS

(71) Applicant: COMPAGNIE GENERALE DES ETABLISSEMENTS MICHELIN, Clermont-Ferrand (FR)

(72) Inventors: Christopher Barton, Clermont-Ferrand (FR); Christophe Chebaut, Clermont-Ferrand (FR); Mael Jude, Clermont-Ferrand (FR); Maxime Rolland, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 17/259,114

(22) PCT Filed: Jul. 10, 2019

(86) PCT No.: PCT/FR2019/051732
§ 371 (c)(1),
(2) Date: Jan. 8, 2021

(87) PCT Pub. No.: WO2020/012122
PCT Pub. Date: Jan. 16, 2020

(65) Prior Publication Data
US 2021/0268847 A1    Sep. 2, 2021

(30) Foreign Application Priority Data
Jul. 11, 2018   (FR) ........................................ 1856385

(51) Int. Cl.
*B60C 15/00*  (2006.01)
*B60C 15/06*  (2006.01)
*B60C 13/00*  (2006.01)

(52) U.S. Cl.
CPC ...... *B60C 15/0628* (2013.01); *B60C 15/0009* (2013.01); *B60C 2013/007* (2013.01); *B60C 2015/065* (2013.01); *B60C 2200/06* (2013.01)

(58) Field of Classification Search
CPC ... B60C 13/003; B60C 15/00; B60C 15/0009; B60C 2015/065; B60C 2200/06; B60C 15/0628
See application file for complete search history.

(56) References Cited

U.S. PATENT DOCUMENTS

| 4,070,436 A | * | 1/1978 | Gardner | ................ B29D 30/00 264/315 |
| 4,398,584 A | | 8/1983 | Tansei et al. | |

(Continued)

FOREIGN PATENT DOCUMENTS

| FR | 2 779 387 | 12/1999 |
| GB | 2 065 573 | 7/1981 |

(Continued)

*Primary Examiner* — Cedrick S Williams
(74) *Attorney, Agent, or Firm* — Cozen O'Connor

(57) ABSTRACT

A tire having a radial carcass reinforcement, made up of a single layer of reinforcing elements anchored in each of the beads by being turned up around a bead wire, reinforced by a stiffener. In the sidewall of the tire, the profile of the outer surface of the tire is at a constant distance from the carcass reinforcement layer between the points F and A, and meets the outer surface of the bead at the point C, forming two successive circular arcs.

14 Claims, 3 Drawing Sheets

(56) References Cited

U.S. PATENT DOCUMENTS

| | | | | |
|---|---|---|---|---|
| 4,408,648 A | * | 10/1983 | Ohashi | B60C 13/003 |
| | | | | 152/523 |
| 5,318,088 A | * | 6/1994 | Billieres | B60B 21/10 |
| | | | | 152/379.3 |
| 2006/0000199 A1 | | 1/2006 | Alain et al. | |
| 2013/0340913 A1 | * | 12/2013 | Sallaz | B60C 9/0007 |
| | | | | 152/552 |
| 2015/0041038 A1 | * | 2/2015 | Tanno | B60C 13/002 |
| | | | | 264/129 |
| 2015/0096658 A1 | * | 4/2015 | Johnson | B60C 1/0041 |
| | | | | 152/556 |
| 2017/0326921 A1 | * | 11/2017 | Francia | B60C 15/0018 |

FOREIGN PATENT DOCUMENTS

| | | |
|---|---|---|
| JP | 2000-158919 | 6/2000 |
| WO | WO 2018/011509 | 1/2018 |

* cited by examiner

TIRE HAVING REINFORCED SIDEWALLS

RELATED APPLICATIONS

This is a U.S. National Phase Application under 35 USC 371 of International Application PCT/FR2019/051732 filed on Jul. 10, 2019.

This application claims the priority of French application no. 18/56385 filed Jul. 11, 2018, the entire content of which is hereby incorporated by reference.

FIELD OF THE INVENTION

The present invention relates to a tire having a radial carcass reinforcement, and more particularly to a tire intended to equip vehicles that carry heavy loads and run at a sustained speed, such as lorries, tractors, trailers or buses, for example.

BACKGROUND OF THE INVENTION

In tires of heavy-duty type, the carcass reinforcement is generally anchored on either side in the region of the bead and is surmounted radially by a crown reinforcement made up of at least two layers that are superimposed and formed of threads or cords that are parallel in each layer and crossed from one layer to the next, making angles of between 10° and 45° with the circumferential direction. Said working layers that form the working reinforcement may also be covered with at least one layer, referred to as protective layer, formed of reinforcing elements that are advantageously metal and extensible and are referred to as elastic reinforcing elements. It may also comprise a layer of metal threads or cords of low extensibility that make an angle of between 45° and 90° with the circumferential direction, this ply, referred to as the triangulation ply, being situated radially between the carcass reinforcement and the first crown ply, referred to as the working ply, which are formed of parallel threads or cords that exhibit angles at most equal to 45° in terms of absolute value. The triangulation ply forms, with at least said working ply, a triangulated reinforcement that exhibits little deformation under the various stresses to which it is subjected, the triangulation ply essentially serving to absorb the transverse compressive forces that act on all the reinforcing elements in the crown region of the tire.

Cords are said to be inextensible when said cords exhibit, under a tensile force equal to 10% of the breaking force, a relative elongation at most equal to 0.2%.

Cords are said to be elastic when said cords exhibit, under a tensile force equal to the breaking load, a relative elongation at least equal to 3% with a maximum tangent modulus of less than 150 GPa.

Circumferential reinforcing elements are reinforcing elements that make angles in the range +2.5°, —2.5° around 0° with the circumferential direction.

The circumferential direction of the tire, or longitudinal direction, is the direction corresponding to the periphery of the tire and defined by the direction of running of the tire.

The transverse or axial direction of the tire is parallel to the axis of rotation of the tire.

The radial direction is a direction that intersects the axis of rotation of the tire and is perpendicular thereto.

The axis of rotation of the tire is the axis about which it turns in normal use.

A radial or meridian plane is a plane that contains the axis of rotation of the tire.

The circumferential median plane, or equatorial plane, is a plane that is perpendicular to the axis of rotation of the tire and divides the tire into two halves.

For metal threads or cords, force at break (maximum load in N), breaking strength (in MPa), elongation at break (total elongation in %) and modulus (in GPa) are measured under tension in accordance with the standard ISO 6892 of 1984.

Such tires also usually have, at the beads, one or more layers of reinforcing elements referred to as stiffeners. These layers are usually made up of reinforcing elements that are oriented at an angle of less than 45°, and usually less than 25°, with respect to the circumferential direction. These layers of reinforcing elements have in particular the role of limiting the longitudinal displacements of the materials that make up the bead with respect to the rim of the wheel in order to limit premature wearing of said bead. They also make it possible to limit the permanent deformation of the bead on the rim flange, caused by the phenomenon of dynamic creep of the elastomer materials. This deformation of the bead, when excessive, may prevent the retreading of the tires. They also help to protect the bottom regions of the tire from the stresses to which the tires are subjected when they are fitted on and removed from the rims.

Furthermore, in the case of anchoring the carcass reinforcement around a bead wire, which consists in at least partly winding the carcass reinforcement around a bead wire in each of the beads, forming a turn-up that extends to a greater or lesser height in the sidewall, the layers of reinforcing elements or stiffener also make it possible to prevent or delay the unwinding of the carcass reinforcement during accidental and excessive temperature rises of the rim.

These layers of reinforcing elements or stiffeners are usually positioned axially on the outside of the turn-up of the carcass reinforcement and extend in the sidewall to a greater height than that of the turn-up in particular in order to cover the free ends of the reinforcing elements of said turn-up.

Such designs of tires are described for example in the documents FR 2779387 and US 2006/0000199, or in GB 2065573.

The presence of these layers of reinforcing elements or stiffeners helps to thicken the region of the bead as far as the bottom of the region of the sidewall in the direction of the region of the tire in which the latter has its greatest axial width. This profile of the tire appears to bring about weaknesses in the tire with respect to certain types of impact, in particular when the tire comes into contact with kerbs.

The inventors thus set themselves the task of providing tires for "heavy-duty" vehicles, the performance levels in terms of endurance of which, in particular the endurance of the bead regions, is preserved and the design of which makes it possible to reduce the risks of damage when the tire comes into contact with a kerb.

This aim has been achieved according to the invention by a tire intended to be mounted on a hollow rim of the 15° drop center type, comprising a radial carcass reinforcement made up of a single carcass reinforcement layer formed of reinforcing elements, said tire comprising a crown reinforcement, itself capped radially by a tread, said tread being joined to two beads via two sidewalls, the layer of reinforcing elements of the carcass reinforcement being anchored in each of the beads by being turned up around a bead wire so as to form a main part of the carcass reinforcement layer extending from one bead wire to the other and a turn-up of the carcass reinforcement layer in each of the beads, said turn-up of the carcass reinforcement being reinforced by at least one layer of reinforcing elements or stiffener, and, in a meridian cross section of said tire, any point of the profile of the outer surface S of the tire, between a first point F, itself defined by the intersection of an axially oriented straight line, passing through the axially outermost point E of the main part of the carcass reinforcement layer and the outer surface S of the tire, and a point A, is at a constant distance T from the main part of the carcass reinforcement layer, said distance being measured at any point in a direction normal to the main part of the carcass reinforcement layer, the point A is radially on the outside of a first circle C1 of radius R1 that is centered on the end of the turn-up of the carcass reinforcement layer, R1 being between 8 and 13 mm, radially on the inside of the point A, the outer surface S of the tire is continued by a circular arc of radius R2, the center of which is axially on the outside of the surface S of the tire, and the radius R2 of which is between 50% and 125% of the distance between the point F and the center of gravity of the bead wire, the circular arc of radius R2 is tangent at its radially innermost end B to a circular arc of radius R3, the center of which is axially on the inside of the surface S of the tire, and continues the outer surface S of the tire radially inwards as far as the point C, said point C being a point of contact between the circular arc of radius R3 and the circle C2 of radius R1 centered on the radially outermost end of the stiffener, said point C being radially on the inside of the axially outermost point D of the circle C2, the radius R3 being between 50% and 125% of the distance between the point F and the center of gravity of the bead wire.

SUMMARY OF THE INVENTION

Within the meaning of the invention, a hollow rim of the 15° drop center type, or drop center rim, is a one-piece rim, as defined in the ETRTO, the seats of which that are intended to receive the beads of the tire have a frustoconical shape, the angle formed with the axial direction being substantially equivalent to 15°. These seats are also extended by rim flanges of reduced height compared with flanges of flat-base rims, the rim seats of which have substantially cylindrical shapes.

The meridian cross section of the tire is defined in accordance with the invention such that the centers of mass of the bead wires form an axially oriented straight line, said centers of mass being at a distance from each other by a distance equal to the width of the nominal rim J increased by 20 mm and decreased by twice the distance measured axially between a center of mass of a bead wire and a point on the outer surface of the tire.

The position of the axially outermost point of the main part of the carcass reinforcement is determined on a mounted tire inflated under nominal conditions. This determination can be carried out for example using a tomographic technique.

The distance T is measured along the normal to the main part of the carcass reinforcement layer between the axially outermost point of a reinforcement of the carcass reinforcement layer and a point of said surface S.

Within the meaning of the invention, a constant distance T means that the distance T does not vary by more than 0.5 mm. The variations in thickness are then caused only by creep phenomena during the manufacturing and curing of the tire.

The center of gravity of the bead wire is determined on meridian cross section of the tire.

According to a preferred embodiment of the invention, the radius R2 is greater than 1.5 times the radius R1 and preferably less than 8 times the radius R1.

Advantageously according to the invention, the distance T, measured in a direction normal to the main part of the carcass reinforcement layer, is greater than 3 mm and preferably less than 7 mm.

Tests have shown that the tires that are thus produced according to the invention exhibit less deterioration and therefore offer better resistance in terms of wear due to impacts and/or rubbing against kerbs. Furthermore, the tires according to the invention appear to retain performance levels in terms of endurance, and in particular in terms of endurance in the regions of the beads, that are at least as good as those of tires with a more conventional design.

These results are all the more surprising given that the more conventional designs of this type of tire have a bead region that is relatively thick as far as the bottom of the region of the sidewall in the direction of the region of the tire in which the latter exhibits its greatest axial width, in particular so as to better absorb attacks caused by the impacts or friction suffered during contact with kerbs.

The inventors have thus been able to show that the tires produced in accordance with the invention, which have a bead region that is relatively thin in its radially outermost part, are able to resist attacks better in the event of contact with kerbs, while maintaining satisfactory properties in terms of endurance.

The inventors believe that these results can be interpreted by the fact that the profile of the outer surface of the tire between the point F and the point C, as defined above, leads to a change in said profile between the region connecting the sidewall to the bead of a tire, said region making it possible to enlarge the part of the sidewall that has a constant thickness T. According to the inventors, such a profile will lead to more uniform deformations of the tire during contact with kerbs and will make it possible to limit the risks of abrasion and/or of tearing at the outer surface of the tire. Specifically, during an impact with a kerb, the contact region of the tire is effectively the outer surface thereof and more particularly the region situated between the points F and A as defined above. The constant thickness T of the sidewall appears to allow more uniform deformation and thus a better distribution of the forces experienced in the event of an impact with or rubbing against a kerb.

The inventors have also been able to show that the profile of the outer surface of the tire according to the invention between the point F and the point C can also prevent problems of wear in the case of tires mounted in twinned pairs. Specifically, they have shown that the profile of the tire encourages the removal of stones that could become stuck between the tires before said stones cause damage in the region of the bead of the tire.

According to an advantageous variant of the invention, the radial distance between the point F and the point A is greater than 70% of the radial distance between the point F and the radially outermost point G of the outer surface S of the tire, for which the distance, measured in a direction normal to the main part of the carcass reinforcement layer, between said main part of the carcass reinforcement layer and the surface S, is equal to T, said distance between any point, on the outer surface S of the tire, radially between the points F and G and the main part of the carcass reinforcement layer being constant.

According to this advantageous variant of the invention, the profile of the sidewall thus defined appears to provide even better uniformity of the deformation in the event of an impact with and/or rubbing against a kerb.

According to a preferred embodiment of the invention, the radially outermost end of the stiffener is radially on the outside of the end of the turn-up of the carcass reinforcement layer. Such an embodiment makes it possible, for the one part, to prevent the respective ends of the stiffener and of the turn-up of the carcass reinforcement layer from coinciding, said ends being radially offset. For the other part, the stiffener fully provides a function of protecting the turn-up of the carcass reinforcement layer in particular as regards contact with the rim flange and pressure applied thereto when the tire is rolling.

According to other embodiments, the radially outermost end of the stiffener is radially on the inside of the end of the turn-up of the carcass reinforcement layer.

As far as the radially innermost end of the stiffener is concerned, it can be radially on the outside of the radially innermost point of the bead wire. According to other embodiments, the stiffener may be fitted radially under the bead wire, and its radially innermost end is then radially on the inside of the bead wire. According to yet other embodiments, the stiffener can be wound around the bead wire and its radially innermost end is then axially on the inside of the carcass reinforcement layer.

According to an advantageous embodiment of the invention, in any meridian plane, in each bead, the tire has a retention reinforcement surrounding the bead wire and a volume of rubber compound in direct contact with the bead wire.

According to one embodiment of the invention, in particular for further improving the performance levels in terms of endurance of the tire, the carcass reinforcement is formed of cords, the structure of which is heavily penetrated with polymer compounds. These may be for example cords, the construction of which makes it possible to increase the penetrability thereof with polymer compounds. They may also be cords in which polymer compounds are introduced during the manufacture of the cords themselves. They are then for example cords having at least two layers, at least one internal layer being sheathed with a layer made of a rubber composition that is not crosslinkable, is crosslinkable or is crosslinked, preferably based on at least one diene elastomer.

Such cords of the carcass reinforcement having higher penetration levels than normal can allow the tire to distribute the deformation much better along the length, while avoiding local concentrations that result in small radii of curvature.

Specifically, the cords of the carcass reinforcement, thus defined according to the invention, which have been subjected to significant bending phenomena during impacts with the kerb, can exhibit better resistance to these bending phenomena on account of their level of penetration by the rubber compounds, which causes better deformation uniformity between the regions of the cord in extension and in compression that are caused by the bending.

According to an embodiment variant of the invention, the crown reinforcement of the tire is formed of at least two working crown layers of advantageously inextensible reinforcing elements that are crossed from one layer to the next, forming angles of between 10° and 45° with the circumferential direction.

According to other embodiment variants of the invention, the crown reinforcement also has at least one layer of circumferential reinforcing elements.

One preferred embodiment of the invention also provides for the crown reinforcement to be supplemented radially on the outside by at least one additional layer, referred to as a protective layer, of reinforcing elements, referred to as elastic reinforcing elements, that are oriented at an angle of between 10° and 45° with respect to the circumferential direction and in the same direction as the angle formed by the inextensible elements of the working layer radially adjacent thereto.

The protective layer can have an axial width that is less than the axial width of the least wide working layer. Said protective layer can also have an axial width that is greater than the axial width of the least wide working layer, such that it overlaps the edges of the least wide working layer and, when the radially upper layer is the one that is least wide, such that it is coupled, in the axial continuation of the additional reinforcement, with the widest working crown layer over an axial width and is then decoupled, axially on the outside, from said widest working layer by profiled elements having a thickness at least equal to 2 mm. The protective layer formed of elastic reinforcing elements can, in the case mentioned above, be optionally decoupled from the edges of said least wide working layer by profiled elements having a thickness that is substantially less than the thickness of the profiled elements separating the edges of the two working layers, and can also have an axial width that is less than or greater than the axial width of the widest crown layer.

According to any one of the embodiments of the invention that are set out above, the crown reinforcement may also be supplemented, radially on the inside between the carcass reinforcement and the radially inner working layer closest to said carcass reinforcement, by a triangulation layer made of inextensible steel metal reinforcing elements that form an angle of greater than 60° with the circumferential direction and in the same direction as that of the angle formed by the reinforcing elements of the radially closest layer of the carcass reinforcement.

BRIEF DESCRIPTION OF THE DRAWINGS

Further details and advantageous features of the invention will become apparent in the following text from the description of exemplary embodiments of the invention, in particular with reference to FIGS. 1 to 3, in which.

In order to make them easier to understand, the figures are not shown to scale.

Figure 1:
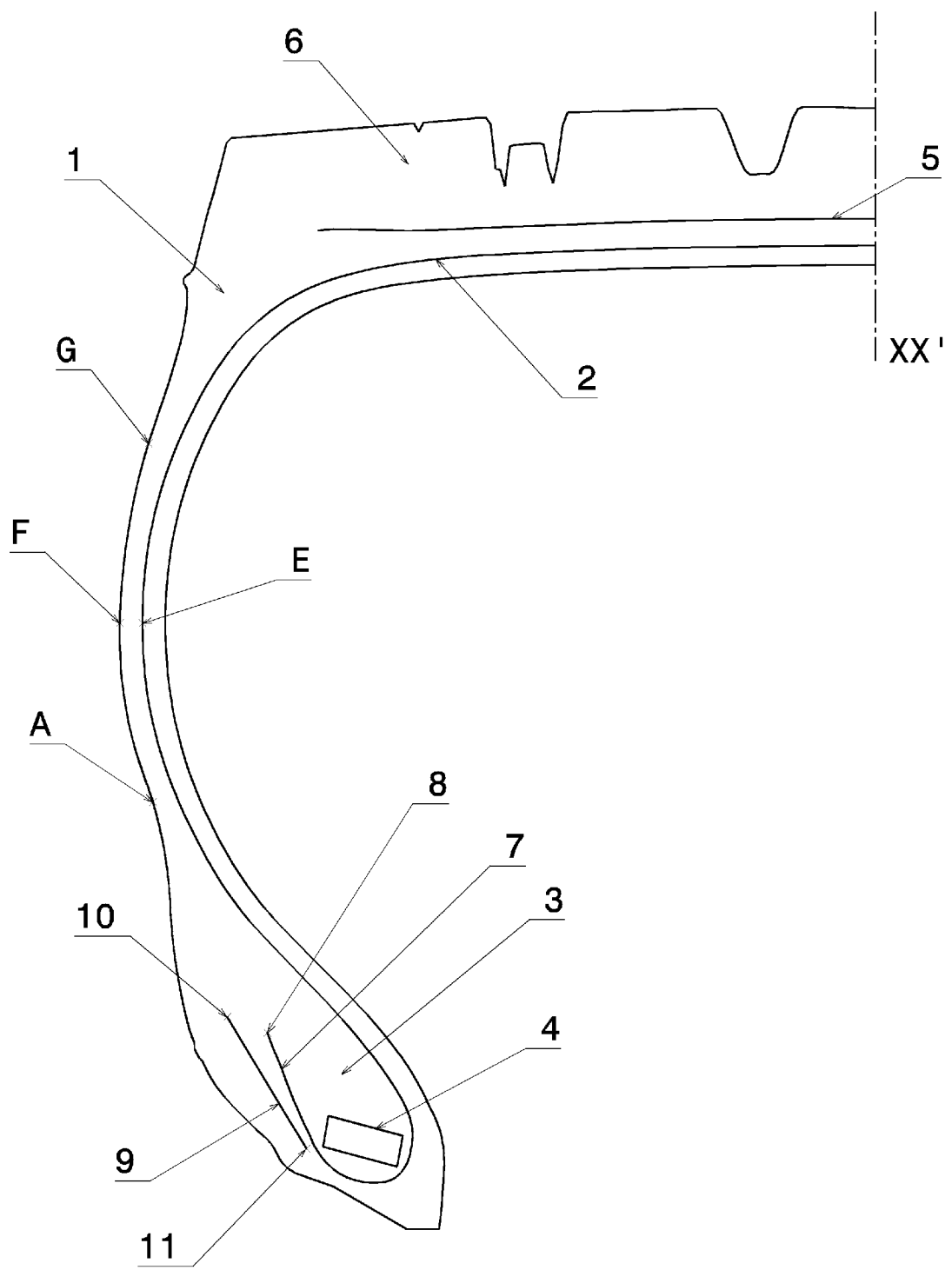
FIG. 1 shows a schematic meridian view of a tire according to the invention.
Figure 3:
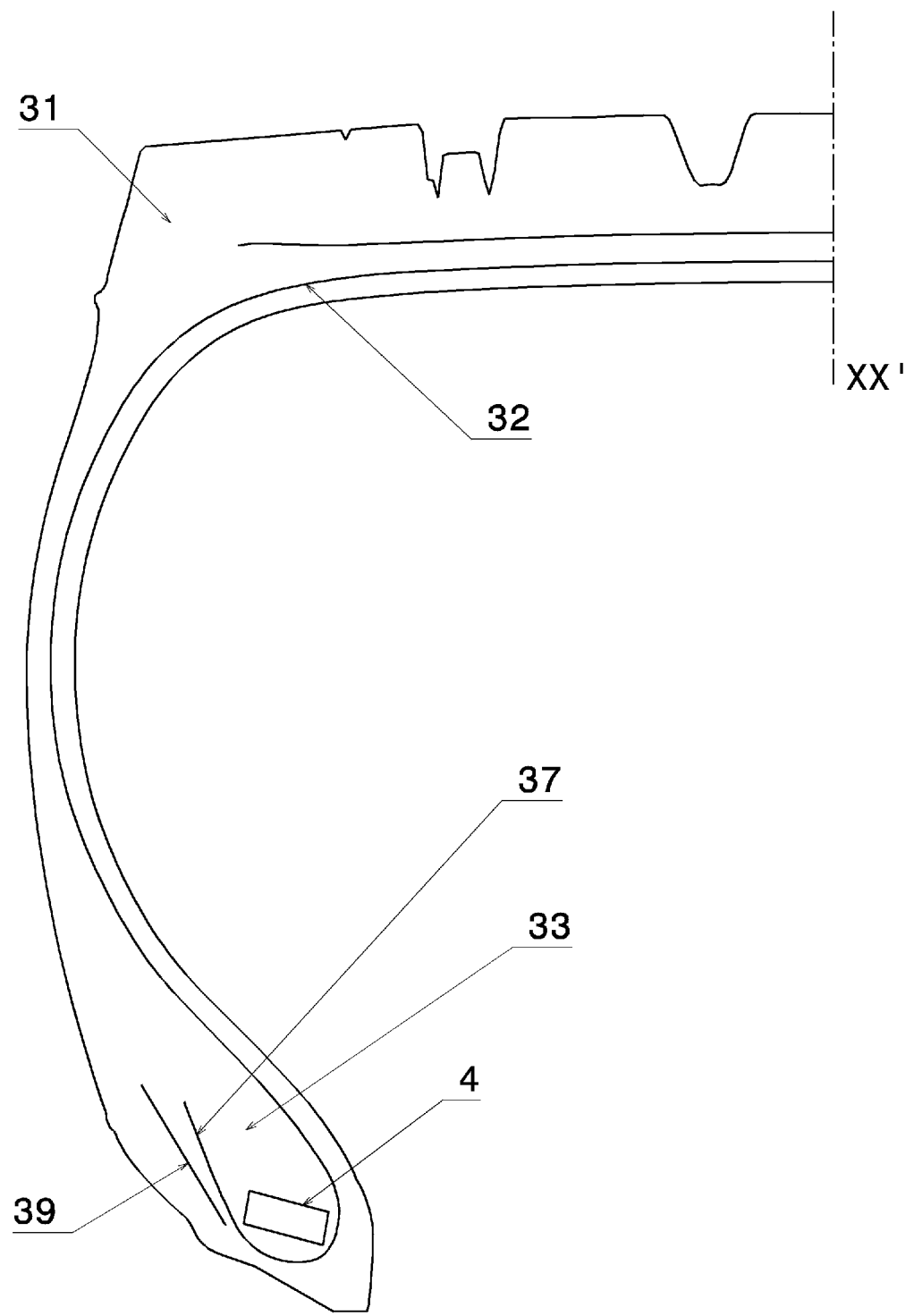
FIG. 3 shows an enlarged schematic depiction of the region of a bead of a reference tire.

FIGS. 1 and 3 show only a half-view of a tire, which extends symmetrically with respect to the axis XX', which represents the circumferential median plane, or equatorial plane, of the tire.

DETAILED DESCRIPTION OF THE PRESENTLY PREFERRED EMBODIMENTS

In FIG. 1, the tire 1 is of size 315/70 R 22.5. Said tire 1 comprises a radial carcass reinforcement 2 anchored in two beads 3. The carcass reinforcement 2 is hooped at the crown of the tire by a crown reinforcement 5, itself capped by a tread 6.

The carcass reinforcement 2, formed by a single layer of metal cords, is wound, in each of the beads 3, around a bead wire 4 and forms, in each of the beads 3, a turn-up 7 of the carcass reinforcement layer having an end 8.

Located axially on the outside of the turn-up 7 is a stiffener 9, the radially outermost end 10 of which is radially on the outside of the end 8 of the turn-up 7 of the carcass reinforcement layer.

The radially innermost end 11 of the stiffener 9 is radially on the outside of the radially innermost point of the bead wire 4.

Figure 2:
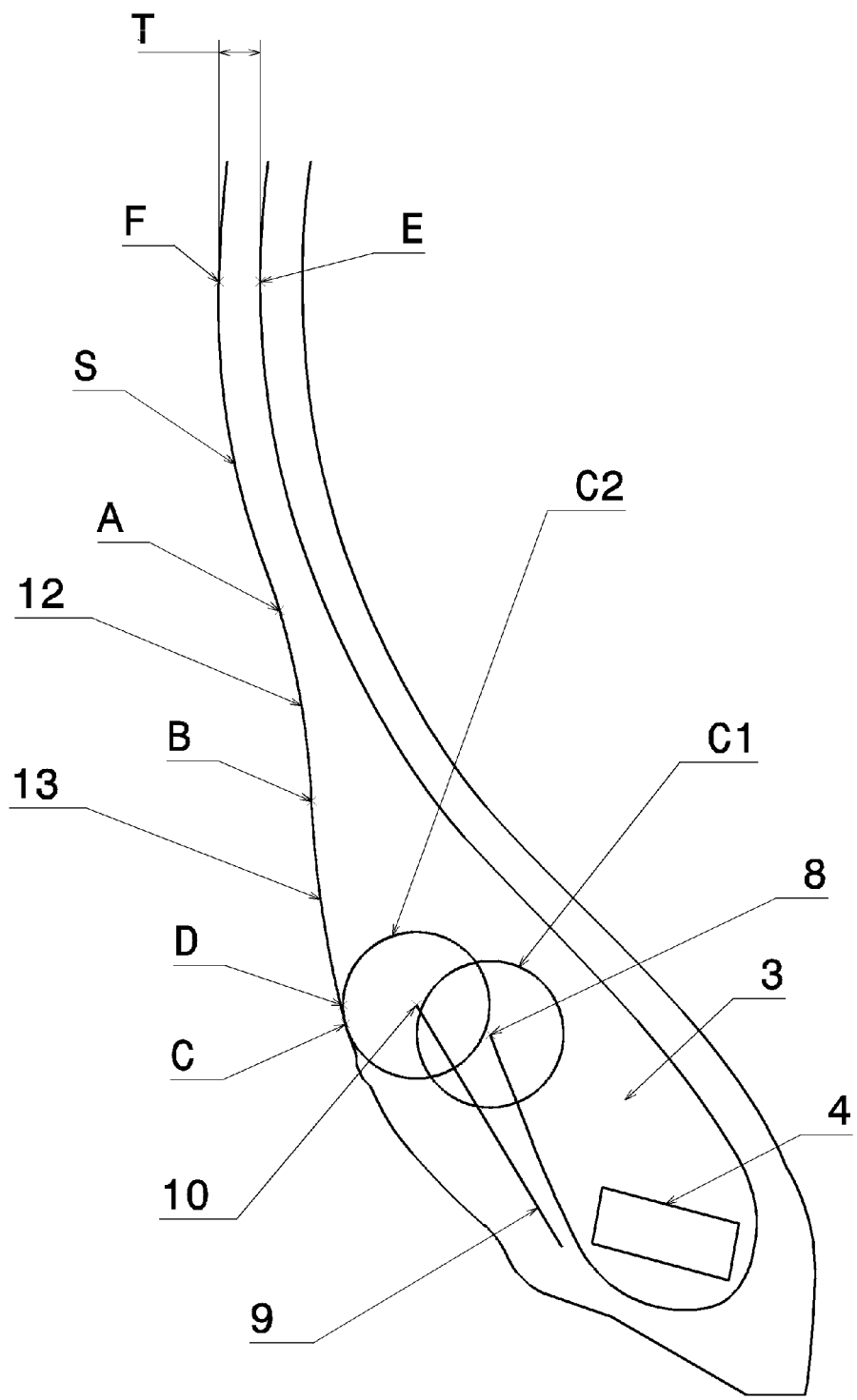
FIG. 2 shows an enlarged schematic depiction of the outer surface of the tire between the bead region and the point F.

FIG. 2 schematically illustrates the outer surface S of the tire between the point F and the region of the bead 3 in a meridian cross section of the tire, which is defined such that the centers of mass of the bead wires 4 form an axially oriented straight line, said centers of mass being at a distance from each other by a distance equal to the width of the nominal rim increased by 20 mm and decreased by twice the distance measured axially between a center of mass of a bead wire 4 and a point on the outer surface of the tire.

The axially outermost point E of the carcass is, for example, determined by tomography, the tire being mounted/inflated under nominal conditions.

The point F is then determined by axial projection of the point E onto the outer surface S of the tire.

The outer surface S of the tire describes a first portion, from the point F to the point A, the latter being radially on the outside of the circle C1 of radius R1 centered on the end 8 of the turn-up of the carcass reinforcement layer.

The distance T measured between any point on the outer surface S of the tire and the main part of the carcass reinforcement layer, said distance being measured at any point in a direction normal to the main part of the carcass reinforcement layer, is equal to 4.7 mm and is substantially constant over this portion between the points F and A.

The radius R1 of the circle 1 is equal to 8.3 mm.

The outer surface S of the tire then continues radially inwards through a circular arc 12 of radius R2, which is itself tangent at B to a circular arc of radius R3, said circular arc continuing the outer surface S of the tire as far as the point C.

The point C is the point of contact between the circular arc 13 and the circle C2 centred on the radially outermost end of the stiffener.

The point C is radially on the inside of the axially outermost point D of the circle C2.

The radius R2 is equal to 90 mm.

The radius R3 is equal to 121 mm.

The distance between the point F and the center of gravity of the bead wire is equal to 119 mm.

The radii R2 and R3 are thus clearly between 50% and 125% of this distance between the point F and the center of gravity of the bead wire.

The radial distance between the point F and the point A is equal to 37 mm.

The point G, which is visible in FIG. 1, is the point, radially on the outside of the point F, from which the distance between a point on the outer surface S of the tire and the main part of the carcass reinforcement layer, measured at any point in a direction normal to the main part of the carcass reinforcement layer, is greater than the distance T.

The radial distance between the point F and the point G is equal to 38 mm.

The radial distance between the point F and the point A is thus clearly greater than 70% of the radial distance between the point F and the point G.

Endurance tests were carried out by running two shaved tires one on the other with a regulated pressure of 5.5 bar and a load of 4571 daN at a speed of 50 km/h and at an ambient temperature of 15° C. for 20 000 km.

The tires according to the invention were compared with reference tires, of which the profile of the outer surface is more conventional. Such a tire profile is shown in FIG. 3.

In this FIG. 3, which shows a tire 31 of the same size, it appears that the region of the bead 33 is similar to that of the tire according to the invention and that the structure of the carcass reinforcement layer 32 is identical, the latter being turned-up around a bead wire 34 in order to form a turn-up 37 reinforced by a stiffener 39. By contrast, the profile of the outer surface of the tire 31 is different from that of the tire according to the invention.

The tests were carried out for the tires according to the invention under conditions identical to those applied to the reference tires.

The tires according to the invention yielded results substantially identical to those of the reference tires.

Further tests were carried out to test the performance levels in terms of resistance to impacts with and/or rubbing against kerbs.

In order to carry out these tests, the tires were also provided with radial striations on their sidewalls.

These tests were carried out on a footway having a 15 cm high kerb. The tire was mounted on a vehicle, the path of which drove the tire at a speed of 20 km/h with an angle of incidence of 10° with respect to the kerb.

The operation was repeated 6 times and then the sidewall was analyzed to detect any tears.

The reference tire had two tears, as did the tire according to the invention.

As far as the surface that struck the kerb is concerned, it is 10% weaker on the tire according to the invention compared with the reference tire.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire configured to be mounted on a hollow rim of the 15° drop center type, comprising:
    a radial carcass reinforcement made up of a single carcass reinforcement layer formed of reinforcing elements,
    a crown reinforcement, itself capped radially by a tread, said tread being joined to two beads via two sidewalls,
    the layer of reinforcing elements of the carcass reinforcement being anchored in each of the beads by being turned up around a bead wire to form a main part of the carcass reinforcement layer extending from one bead wire to the other and a turn-up of the carcass reinforcement layer in each of the beads,
    said turn-up of the carcass reinforcement being reinforced by at least one layer of reinforcing elements or stiffener, wherein in a meridian cross section of said tire,
    wherein in an uninflated state the centers of mass of the bead wires form an axially oriented straight line, said centers of mass being at a distance from each other by a distance equal to the width of the rim increased by 20 mm and decreased by twice a distance measured axially between a center of mass of a bead wire and a point on the outer surface of the tire;

any point of the profile of an outer surface (S) of the tire, between a first point (F), itself defined by an intersection of an axially oriented straight line, passing through an axially outermost point (E) of the main part of the carcass reinforcement layer and the outer surface (S) of the tire, and a point (A), is at a constant distance (T) from the main part of the carcass reinforcement layer, said distance being measured at any point in a direction normal to the main part of the carcass reinforcement layer, the point (A) is radially on the outside of a first circle (C1) of radius R1 that is centered on the end of the turn-up of the carcass reinforcement layer, R1 being between 8 and 13 mm, radially on the inside of the point (A), the outer surface (S) of the tire is continued by a circular arc of radius R2, the center of which is axially on the outside of the surface (S) of the tire, and the radius R2 of which is between 50% and 125% of the distance between the point (F) and the center of gravity of the bead wire, the circular arc of radius R2 is tangent at its radially innermost end (B) to a circular arc of radius R3, the center of which is axially on the inside of the surface (S) of the tire, and continues the outer surface (S) of the tire radially inwards as far as the point (C), said point (C) being a point of contact between the circular arc of radius R3 and the circle (C2) of radius R1 centered on the radially outermost end of the stiffener, said point (C) being radially on the inside of the axially outermost point (D) of the circle (C2), the radius R3 being between 50% and 125% of the distance between the point (F) and the center of gravity of the bead wire, and the radius R2 is between 1.5 times the radius R1 and 8 times the radius R1.

2. The tire according to claim 1, wherein the reinforcing elements of the carcass reinforcement layer are cords having at least two layers, at least one internal layer being sheathed with a layer made of a rubber composition that is not crosslinkable, is crosslinkable or is crosslinked, preferably based on at least one diene elastomer.

3. The tire according to claim 1, wherein, in any meridian plane, in each bead, the tire (1) has a retention reinforcement surrounding the bead wire and a volume of rubber compound in direct contact with the bead wire.

4. The tire according to claim 1, wherein a radially innermost end of the stiffener is radially on the outside of a radially innermost point of the bead wire.

5. The tire according to claim 1, wherein the axially outermost point (E) of the main part of the carcass reinforcement layer is determined on a mounted tire inflated under nominal conditions.

6. The tire according to claim 1, wherein the radial distance between the point (F) and the point (A) is greater than 70% of the radial distance between the point (F) and the radially outermost point (G) of the outer surface (S) of the tire, for which the distance, measured in a direction normal to the main part of the carcass reinforcement layer, between said main part of the carcass reinforcement layer and the surface (S), is equal to (T), said distance between any point, on the outer surface (S) of the tire, radially between the points (F) and (G) and the main part of the carcass reinforcement layer being constant.

7. The tire according to claim 6, wherein the reinforcing elements of the carcass reinforcement layer are cords having at least two layers, at least one internal layer being sheathed with a layer made of a rubber composition that is not crosslinkable, is crosslinkable or is crosslinked, preferably based on at least one diene elastomer.

8. The tire according to claim 1, wherein the radially outermost end of the stiffener is radially on the outside of the end of the turn-up of the carcass reinforcement layer.

9. The tire according to claim 8, wherein the reinforcing elements of the carcass reinforcement layer are cords having at least two layers, at least one internal layer being sheathed with a layer made of a rubber composition that is not crosslinkable, is crosslinkable or is crosslinked, preferably based on at least one diene elastomer.

10. The tire according to claim 8, wherein, in any meridian plane, in each bead, the tire has a retention reinforcement surrounding the bead wire and a volume of rubber compound in direct contact with the bead wire.

11. The tire according to claim 1, wherein distance (T), measured in a direction normal to the main part of the carcass reinforcement layer, is greater than 3 mm and preferably less than 7 mm.

12. The tire according to claim 11, wherein the radial distance between the point (F) and the point (A) is greater than 70% of the radial distance between the point (F) and the radially outermost point (G) of the outer surface (S) of the tire, for which the distance, measured in a direction normal to the main part of the carcass reinforcement layer, between said main part of the carcass reinforcement layer and the surface (S), is equal to (T), said distance between any point, on the outer surface (S) of the tire, radially between the points (F) and (G) and the main part of the carcass reinforcement layer being constant.

13. The tire according to claim 11, wherein the radially outermost end of the stiffener is radially on the outside of the end of the turn-up of the carcass reinforcement layer.

14. The tire according to claim 11, wherein, in any meridian plane, in each bead, the tire has a retention reinforcement surrounding the bead wire and a volume of rubber compound in direct contact with the bead wire.

* * * * *